United States Patent
Brighton et al.

(10) Patent No.: US 7,943,260 B2
(45) Date of Patent: May 17, 2011

(54) SYSTEM AND METHOD FOR RECIRCULATING UNUSED FUEL IN FUEL CELL APPLICATION

(75) Inventors: Fred G. Brighton, Ann Arbor, MI (US); Kurt David Osborne, Dearborn, MI (US); Milos Milacic, New Boston, MI (US)

(73) Assignee: Ford Motor Company, Dearborn, MI (US)

( * ) Notice: Subject to any disclaimer, the term of this patent is extended or adjusted under 35 U.S.C. 154(b) by 959 days.

(21) Appl. No.: 11/830,898

(22) Filed: Jul. 31, 2007

(65) Prior Publication Data

US 2009/0035618 A1  Feb. 5, 2009

(51) Int. Cl.
*H01M 8/04* (2006.01)
(52) U.S. Cl. ........ 429/415; 429/408; 429/430; 429/454; 429/455; 429/456
(58) Field of Classification Search .................. None
See application file for complete search history.

(56) References Cited

U.S. PATENT DOCUMENTS

| | | |
|---|---|---|
| 6,670,067 B2 | 12/2003 | Sato et al. |
| 6,706,438 B2 | 3/2004 | Sahoda et al. |
| 6,800,390 B2 | 10/2004 | Kashiwagi |
| 6,858,340 B2 | 2/2005 | Sugawara et al. |
| 6,901,959 B2 | 6/2005 | Burrola et al. |
| 2003/0096145 A1 | 5/2003 | Sugawara et al. |
| 2003/0148167 A1 | 8/2003 | Sugawara et al. |
| 2003/0180599 A1 | 9/2003 | Kamihara |
| 2005/0002797 A1 | 1/2005 | Morishima |

*Primary Examiner* — Robert Hodge
(74) *Attorney, Agent, or Firm* — Damian Porcari; Brooks Kushman P.C.

(57) ABSTRACT

A system and method for delivering an input fluid stream through a fuel cell stack and discharge an unused fluid stream is provided. An inlet of the fuel cell stack is adapted to receive the fluid stream. An ejector is configured to combine the supply fluid stream and the unused fluid stream to generate the input fluid stream and control the flow of the input fluid stream to the fuel cell stack. A blower is configured to control the flow of the unused fluid stream to the ejector. A bypass valve is configured to control the flow of the unused fluid stream to the blower and to the ejector.

10 Claims, 3 Drawing Sheets

SYSTEM AND METHOD FOR RECIRCULATING UNUSED FUEL IN FUEL CELL APPLICATION

BACKGROUND

1. Technical Field

Embodiments of the present invention generally relate to a system and method for delivering at least one fluid stream through a fuel cell stack.

2. Background Art

It is generally well known that a number of fuel cells are joined together to form a fuel cell stack. Such a stack generally provides electrical current in response to electrochemically converting hydrogen and oxygen into water and energy. The electrical current is used to provide power for various electrical devices. A supply generally provides hydrogen to the fuel cell stack. The fuel cell stack may use less hydrogen than provided by the supply to generate electrical power. An ejector receives unused hydrogen discharged from the fuel cell stack and combines the unused hydrogen with the hydrogen generated from the supply to sustain a flow of hydrogen to the fuel cell stack. The ejector presents the supply hydrogen with the unused hydrogen to the fuel cell stack. The recirculation of the unused hydrogen to the fuel cell stack may improve fuel efficiency.

The amount of flow of hydrogen that is passed through the fuel cell stack and needed to produce electrical current fluctuates based on the different levels of power consumption. In a high power consumption mode, the flow of the unused hydrogen discharged from the fuel cell stack is generally high since the fuel cell stack has to consume more hydrogen at a relatively faster rate in order to meet higher power demands.

During a low power consumption mode, it may be necessary to increase the flow of the hydrogen through the fuel cell stack since the fuel cell stack discharges unused hydrogen at a relatively slower flow rate. Such a slow flow rate of hydrogen may affect the life span of the fuel cell stack and affect the production of electrical power thereby leading to operational inefficiencies.

Accordingly, it would be desirable to provide a system and a method for determining when the vehicle is experiencing high and low power consumption modes and adjust the flow of the hydrogen that is presented to the fuel cell stack based on the consumption modes.

SUMMARY

In one non-limiting embodiment, a system and method for delivering an input fluid stream through a fuel cell stack to generate electrical current and discharge an unused fluid stream is provided. The system comprises a fluid supply, an ejector, an inlet of the fuel cells stack, a blower, and a bypass valve. The fluid supply is adapted to generate a supply fluid stream. The ejector is configured to receive the supply fluid stream and the unused fluid stream. The ejector is further configured to combine the supply fluid stream and the unused fluid stream to generate the input fluid stream. The ejector is further configured to control the flow of the input fluid stream to the fuel cell stack. The inlet of the fuel cell stack is adapted to receive the input fluid stream. The blower is positioned between the ejector and the fuel cell stack and configured to control the flow of the unused fluid stream to the ejector. The bypass valve is positioned between the ejector and the fuel cell stack and configured to control the flow of the unused fluid stream to the blower and to the ejector.

DETAILED DESCRIPTION OF EMBODIMENTS OF THE PRESENT INVENTION

Figure 1:
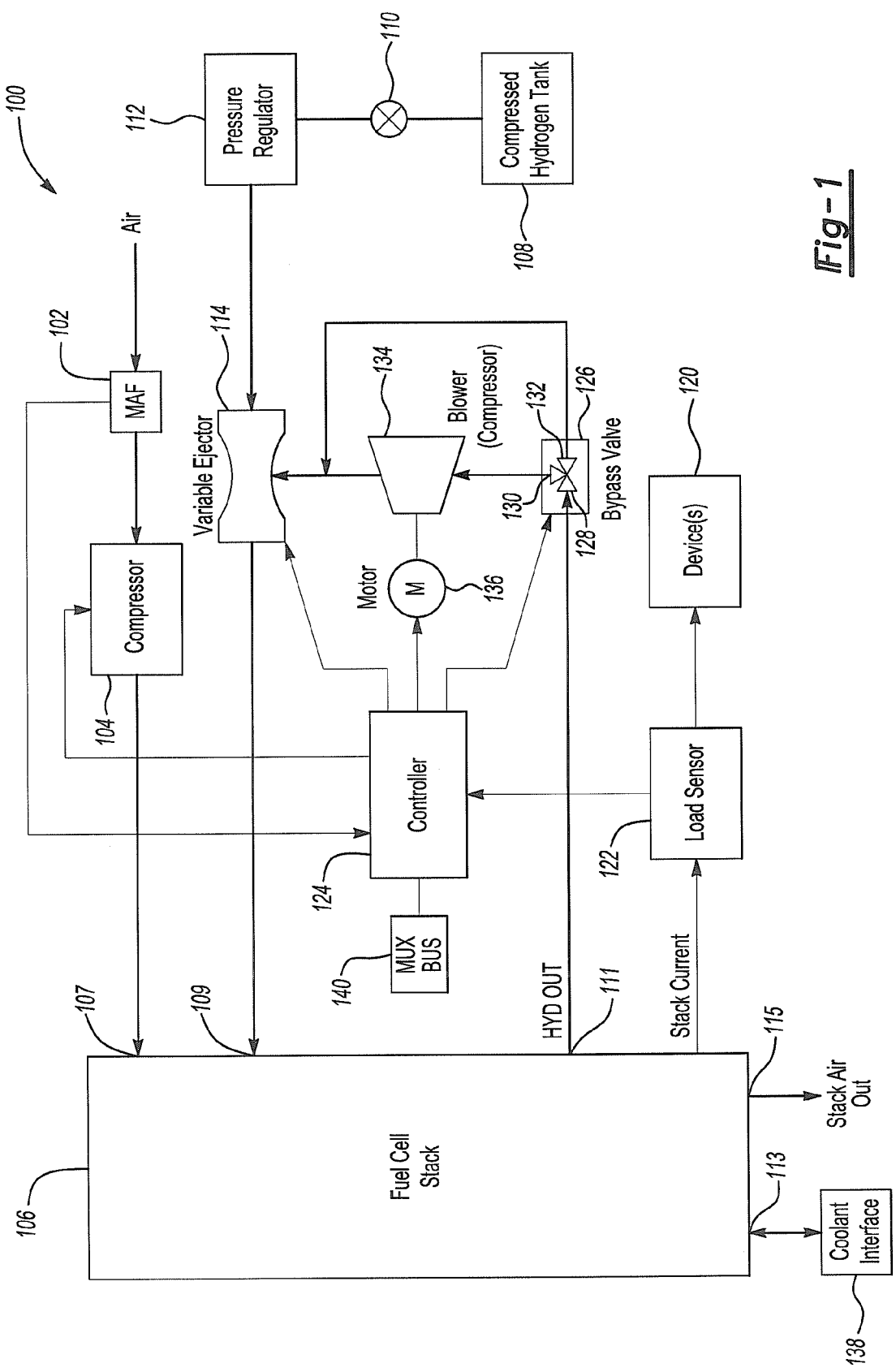
FIG. 1 illustrates an exemplary fuel cell stack recirculating system in accordance with one embodiment of the present invention.

FIG. 1 illustrates an exemplary fuel cell stack recirculating system 100 in accordance with one embodiment of the present invention. The recirculating system 100 may be implemented for any type of fuel cell stack system configuration. In one example, the system 100 may be implemented in an electric vehicle or hybrid vehicle or any such vehicle which uses electrical current to drive devices (including a motor).

A first fluid stream which comprises air is fed to a mass air flow (MAF) sensor 102. The air passing through the MAF sensor 102 may be dry air, or the air may have a high water content. If the air includes a high water content, a humidity sensor (not shown) may be needed to measure the wet air. The MAF sensor 102 measures the flow rate of air in the fluid stream. An air compressor 104 pressurizes the air stream and delivers the air stream to a fuel cell stack 106. The fuel cell stack 106 includes a first inlet 107 for receiving the air stream. In one example, a humidifier may be added to add water to the air stream. The water may be needed to ensure that membranes (not shown) in the fuel cell stack 106 remain humidified to provide for optimal operation of the fuel cell stack 106.

A compressed hydrogen tank 108 presents a supply fluid stream in the form of hydrogen. The supply fluid stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator 112 regulates the pressure of the supply hydrogen. A variable ejector 114 is configured to combine the supply hydrogen (e.g., received from the tank 108) with unused hydrogen (discharged from the fuel cell stack 106) to generate an input fluid stream (or stack hydrogen). In one example, a humidifier may be provided to add water to the input fluid stream. Water in the input fluid stream may be needed to ensure that the membranes in the fuel cell stack 106 remain humidified to provide for optimal operation of the fuel cell stack 106.

The variable ejector 114 controls the flow the input hydrogen to the fuel cell stack 106. The fuel cell stack 106 includes a second inlet 109 that is adapted to receive the input hydrogen from the variable ejector 114. The pressure regulator 112 is adapted to provide the supply hydrogen to the variable ejector 114 at a constant pressure rate. The fuel cell stack 106 generates stack current in response to electrochemically converting the input hydrogen and oxygen from the air stream.

Various electrical devices 120 may consume such stack current in order to operate. If the system 100 is used in connection with a vehicle, the devices 120 may include a motor or a plurality of vehicle electrical components that each consume power to function for a particular purpose. For example, such devices 120 may be associated with the vehicle powertrain, occupant heating and cooling, interior/exterior lighting, entertainment devices, and power locking windows. The following is not intended to be a complete listing of the various power consumption devices in a vehicle. The particular devices 120 implemented in the vehicle may vary based on vehicle content, the type of motor used, and the particular type of fuel cell stack implemented. A load sensor 122 is adapted to measure the amount of current consumed by the devices 120. A controller 124 is configured to receive the measured amounts of current from the load sensor 122.

In general, excess amounts of air and input hydrogen are delivered to the fuel cell stack 106 to increase operational robustness of the fuel cell stack 106. Unused hydrogen may be recirculated and presented back to the fuel cell stack 106 along with the supply hydrogen to improve fuel economy. An outlet 111 of the fuel cell stack 106 is adapted to discharge the unused hydrogen.

A bypass valve 126 is configured to receive the unused portions of the hydrogen from the outlet 111. The bypass valve 126 includes an inlet 128, a first outlet 130 and a second outlet 132. The bypass valve 126 receives the unused hydrogen at the inlet 128. The first outlet 130 of the bypass valve 126 directs the unused hydrogen or a portion of the unused hydrogen to a blower 134. A motor 136 is coupled to the blower 134 to drive the blower 134 at various speeds for either increasing or decreasing the flow and pressure of the unused hydrogen. By ensuring proper pressure levels of the input hydrogen to the fuel cell stack 106, the system 100 may increase the probability for combining hydrogen with oxygen to generate the electrical current. Such proper pressure levels of input hydrogen may also assist in preventing water build up in the membranes of the fuel cell stack 106. The second outlet 132 of the bypass valve 126 directs the unused hydrogen or a portion of the unused hydrogen directly to the variable ejector 114.

The controller 124 presents a first, second and a third control signal to the bypass valve 126, the motor 136 and the variable ejector 114, respectively. The bypass valve 126 is configured to direct the flow of the unused hydrogen to the blower 134 or direct the flow of the unused hydrogen directly to the variable ejector 114 in response to the first control signal. The bypass valve 126 directs the flow of the unused hydrogen based on the amount of power consumed by the device 120. The direction of the flow of the unused hydrogen based on the amount of power consumed by the devices 122 will be discussed in more detail in connection with FIG. 2.

The motor 136 is configured to drive the blower 134 such that the blower 134 increases the flow and pressure of the unused hydrogen to the variable ejector 114 in response to the second control signal. The variable ejector 114 is adapted to increase or decrease the overall flow and pressure of hydrogen (e.g., the unused hydrogen discharged from the fuel cell stack 106 and the supply hydrogen delivered from the tank 108) presented to the fuel cell stack 106 in response to the third control signal. The variable ejector 114 is adapted to receive the supply hydrogen at a constant flow and pressure rate. The variable ejector 114 is adapted to receive the unused hydrogen at varying flow rates.

The variable ejector 114 may be implemented with a solenoid (not shown) and/or a needle valve (not shown). The solenoid may move the needle valve in the ejector 114 in response to the third control signal thereby allowing for an increase or decrease of the flow and pressure of input hydrogen presented to the fuel cell stack 106. The movement of the needle is variable in nature to allow for different flow rates of the unused hydrogen to be combined with the supply hydrogen from the tank 108. Such a variable characteristic allows the variable ejector 114 to adjust the overall flow and pressure of the input hydrogen presented to the fuel cell stack 106.

The fuel cell stack 106 includes an outlet 115 that is configured to discharge excess air. The fuel cell stack 106 includes an outlet 113 that is adapted to present coolant in the form of de-ionized water ethylene glycol (DIWEG) or other suitable coolant in response to combining hydrogen with oxygen (e.g., from the air stream). A cooling interface 138 may receive DIWEG from the fuel cell stack 106. The cooling interface 138 may also provide stack coolant to the fuel cell stack 106.

Figure 2:
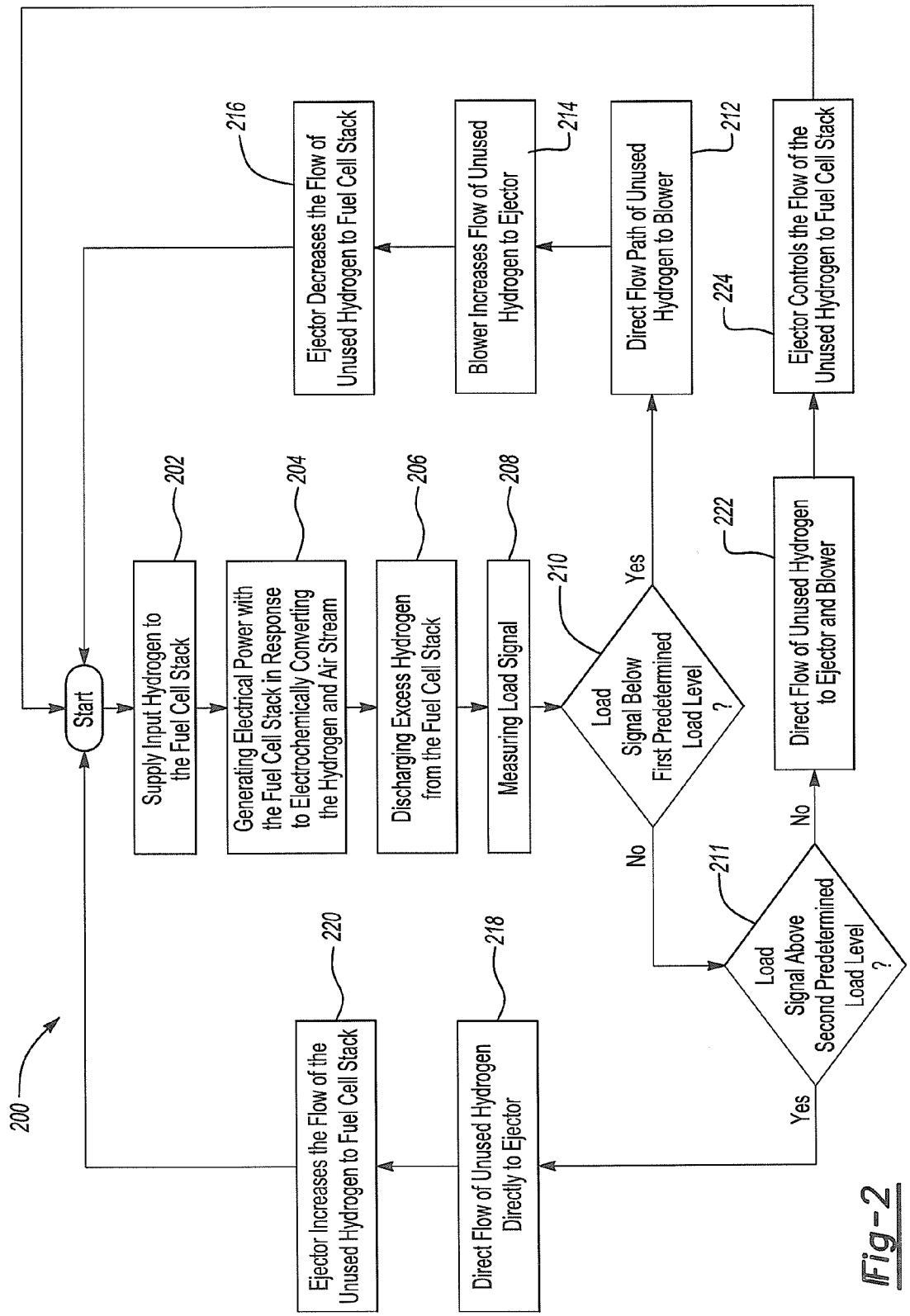
FIG. 2 illustrates a flow diagram for recirculating at least one fluid stream in a fuel cell stack in accordance with one embodiment of the present invention.

FIG. 2 illustrates a flow diagram 200 for recirculating at least one fluid stream through the fuel cell stack 106 in accordance with one embodiment of the present invention. In step 202, the variable ejector 114 supplies hydrogen to the fuel cell stack 106. In step 204, the fuel cell stack 106 generates stack current in response to electrochemically converting the hydrogen and oxygen (from the air stream). In step 206, the fuel cell stack 106 discharges excess or unused hydrogen to the bypass valve 126. In step 208, the load sensor 122 measures the amount of current consumed by the devices 120 and transmits raw electrical data indicative of the amount of current being consumed to the controller 124.

In step 210, the controller 124 determines whether the stack current being consumed by the devices 120 is below a first predetermined load level. The controller 124 processes the raw electrical data and generates a load signal. The controller 124 compares the load signal to the first predetermined load level to determine the flow path for the unused hydrogen. If the load signal is below the first predetermined load level, then the diagram 200 moves to step 212.

In step 212, the valve 126 directs the flow of the unused hydrogen directly to the blower 134. When the load signal is below the first predetermined load level, such a condition is indicative of the system 100 being in a low current consumption state. In one example, for a vehicle fuel cell implementation, the vehicle may be in a low idle state when the load signal is below the first predetermined load level. For the vehicle fuel cell implementation, the first predetermined load level may correspond to a current consumption range of between 0 and 15 amps. The current consumption range corresponding to the first predetermined load level is not intended to be limited to be between 0 and 15 amps. The first predetermined load level for the vehicle fuel cell implementation may vary based on the size and type of fuel cell stack 106 used and on the electrical content of the vehicle.

In the low current consumption state, the fuel cell stack 106 is taking in a lesser amount of hydrogen. In light of the smaller amount of hydrogen that is being consumed by the fuel cell stack 106, the fuel cell stack 106 may discharge the unused hydrogen at a lower flow thereby decreasing the overall flow and pressure of the input hydrogen that is presented to the fuel cell stack 106. Such a decrease in the flow and pressure of input hydrogen to the fuel cell stack 106 may degrade performance and reduce the overall life of the stack 106. To compensate for the lower flow of hydrogen and the low pressure level of hydrogen, the controller 124 controls the bypass valve 126 to direct the flow of the unused hydrogen to the blower 134 and prevent the flow of the unused hydrogen directly to the ejector 114.

In step 214, the blower 134 may increase the flow of unused hydrogen to the variable ejector 114 in response to the controller 124 driving the blower 134 (via the motor 136) to increase the flow and pressure of the unused hydrogen.

In step 216, the variable ejector 114 drives a needle valve of other suitable valve such that a lesser amount of the unused hydrogen is combined with the supply hydrogen in response to the third control signal. Such an effect creates a vacuum (or sonic flow) thereby increasing the overall flow rate and pressure of the input hydrogen presented to the fuel cell stack 106. In general, steps 212 through 214 are indicative of the system 100 performing an active recirculation of the unused hydrogen through the fuel cell stack 106. Such an increase in the flow rate and pressure may increase the probability for electrochemically converting hydrogen with oxygen to generate more electrical current. In step 210, if the controller 124 determines that the load signal is above the first predetermined load level, then the diagram 200 moves to step 211.

In step 211, the controller 124 determines whether the stack current being consumed by the devices 120 is above a second predetermined load level. The controller 124 compares the load signal to the second predetermined load level to determine the flow path for the unused hydrogen. If the load signal is above the second predetermined load level, then the diagram 200 moves to step 218. In step 218, the valve 126 directs the flow of the unused hydrogen directly to the ejector 114.

When the load signal is above the second predetermined load level, such a condition is indicative of the system 100 being in a high current consumption state. In one example, for a vehicle fuel cell implementation, the vehicle may be in a high idle state when the load signal is above the second predetermined load level. For the vehicle fuel cell implementation, the second predetermined load level may correspond to the device 120 consuming over 30 amps. The current consumption range corresponding to the second predetermined load level is not intended to be limited to a current consumption value of over 30 amps. The second predetermined load level for the vehicle fuel cell implementation may vary based on the size and type of fuel cell stack 106 used and the electrical content of the vehicle.

In the high current consumption state, the fuel cell stack 106 is taking in a greater amount of hydrogen in order to provide increased levels of current needed to drive the devices 120. In light of the greater amount of hydrogen that is being received by the fuel cell stack 106, the fuel cell stack 106 outputs the unused hydrogen at a higher flow and pressure rate. While in the high current consumption state, the controller 124 controls the bypass valve 126 to direct the flow of the unused hydrogen directly to the ejector 114.

In response to the controller 124 controlling the bypass valve 126 to direct the flow of the unused hydrogen directly to the variable ejector 114, the controller 124 may shut down the blower 134 and the motor 136. In step 220, the controller 124 may drive the variable ejector 114 such that the needle valve in the ejector 114 moves to a position so as to allow for an increased flow of the unused hydrogen to pass through the ejector 114 along with the constant flow of the supply hydrogen provided from the tank 108. Such an increased flow of the unused hydrogen through the ejector 114 along with the constant flow of hydrogen from tank 108 may be sufficient to meet the increased hydrogen flow demands placed on the system 100 when the system 100 is in the high current consumption state.

In general, steps 218 and 220 are indicative of the system 100 performing a passive recirculation of the unused hydrogen through the fuel cell stack 106. Such a passive recirculation may not need the assistance of the blower 134 to increase the flow of the unused hydrogen through the system 100. The system 100 is adapted to take advantage of the increased flow of the unused hydrogen that is discharged from the fuel cell stack 106 to assist in providing for an adequate amount of pressure and flow of hydrogen when the system 100 is in the high current consumption state.

If the load signal is not above the second predetermined load level, then the diagram 200 moves to step 222. In step 222, the controller 124 controls the valve 126 to direct the flow of unused hydrogen to the blower 134 and the ejector 114 in response to the controller 124 determining that the load signal is between the first and second predetermined load levels. By directing the flow to both the ejector 114 and the blower 134, the system 100 provides for an additional level of control for controlling the amount of flow and pressure of unused hydrogen that is presented to the fuel cell stack 106. Conventional systems may only provide for two-state control model (on/off) for delivering unused hydrogen to the fuel cell stack 106.

Figure 3:
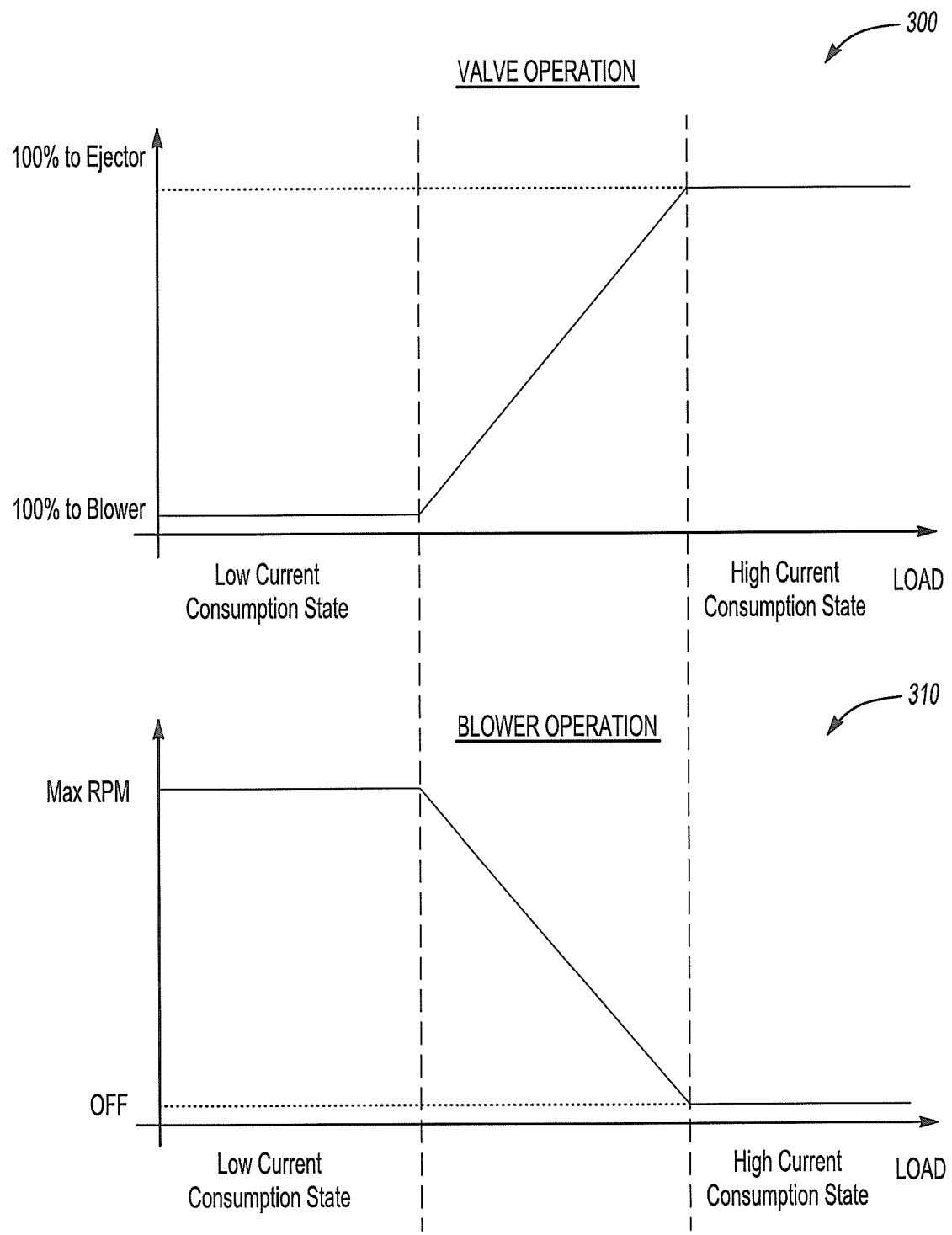
FIG. 3 illustrates a first plot indicating valve operation based on current consumption and a second plot indicating blower operation based on current consumption in accordance to one embodiment of the present invention.

FIG. 3 illustrates a first plot 300 indicating valve 126 operation and a second plot 310 indicating blower 134 operation based on the current consumption states. While the system 100 is in the low current consumption state and in reference to plot 300, the valve 126 may direct the entire flow of the unused hydrogen to the blower 134 and may prevent flow of the unused hydrogen to the ejector 114, in response to the controller 124 determining that the load signal is below the first predetermined load level. As illustrated in the second plot 310, the controller 124 may control the motor 136 to operate the blower 134 at a maximum rpm, in response to the valve 126 directing the flow of unused hydrogen directly to the blower 134.

In reference to plot 300, while the system 100 is in the high current consumption state, the valve 126 may direct the entire flow of the unused hydrogen to the ejector 114 and may prevent flow of the unused hydrogen to the blower 134. As illustrated in the second plot 310, the controller 124 may control the motor 136 to turn off the blower 134 in response to the valve 126 directing the entire flow of the unused hydrogen directly to the ejector 114.

While the system 100 is between the low and high current consumption states (e.g., the load signal is between the first predetermined load level and the second predetermined load level), plot 300 illustrates a linear transition between the amount of flow delivered to both the blower 134 and the ejector 114. As current consumption increases, the controller 124 controls the valve 126 to direct more of the unused hydrogen to the ejector 114 and less to the blower 134. As current consumption decreases, the controller 124 controls the valve 126 to direct more of the unused hydrogen to the blower 134. The system 100 may also be implemented such that the valve 126 controls the amount of flow that is delivered to both the blower 134 and the ejector 114 in a non-linear manner.

When the system 100 is between the low and high current consumption states, plot 310 illustrates a linear control over the operation of the blower 134. As current consumption increases, the controller 124 controls the motor 136 to decrease the speed of the blower 134. As current consumption decreases, the controller 124 controls the motor 136 to increase the speed of the blower 134. The system 100 may also be implemented such that the motor 136 controls the speed of the blower 134 and in a non-linear manner.

The controller 124 may be further configured to receive on/off status of the fuel cell stack 106 over a multiplexed (MUX) bus 140. Other examples may include the controller 124 receiving a hard-wired input, indicative of the on/off status of the fuel cell stack 106. In the case in which the system 100 is implemented in a vehicle, the controller 124 may receive ignition status over the MUX bus 140. In response to receiving an ignition off message over the MUX bus 140, the controller 124 may control the bypass valve 126 and the blower 134 to allow for a predetermined flow of unused hydrogen to pass therethrough for the next vehicle startup. By allowing for a predetermined flow of hydrogen, the system 100 ensures that the fuel cell stack 106 receives an adequate supply of hydrogen when the system 100 starts up. Such a condition may be beneficial particularly if the bypass valve 126 and the blower 134 freeze in colder climates.

While the best mode for carrying out the invention has been described in detail, those familiar with the art to which this invention relates will recognize various alternative designs and embodiments for practicing the invention as defined by the following claims.

What is claimed:

1. A system for delivering an input fluid stream through a fuel cell stack to generate electrical current and discharge an unused fluid stream, the system comprising:
    a fluid supply adapted to produce a supply fluid stream;
    an ejector configured to receive the supply fluid stream and the unused fluid stream, combine the supply fluid stream and the unused fluid stream to generate the input fluid stream, and control the flow of the input fluid stream to the fuel cell stack;
    an inlet of the fuel cell stack adapted to receive the input fluid stream, the fuel cell stack being adapted to drive a device with the electrical current;
    a blower positioned between the ejector and the fuel cell stack and configured to control the flow of the unused fluid stream to the ejector;
    a bypass valve positioned between the ejector and the fuel cell stack, the bypass valve is configured to control the flow of the unused fluid stream to the blower and to the ejector;
    an inlet of the bypass valve receives the unused fluid stream from the fuel cell stack;
    a first outlet of the bypass valve delivers the unused fluid stream to the blower; and
    a second outlet of the bypass valve delivers the unused fluid stream to the ejector.

2. The system of claim 1 wherein the fuel cell stack is adapted to drive a device with the electrical current and the bypass valve is configured to control the flow of the unused fluid stream to the blower and to the ejector based on the amount of electrical current consumed by the device.

3. The system of claim 2 further comprising a controller configured to measure the amount of current used by the device to generate a load signal, the controller compares the load signal to a first predetermined load level and a second predetermined load level and controls the bypass valve to direct the flow of the unused fluid stream to one or more of the blower and the ejector.

4. The system of claim 3 wherein the controller is further configured to control the first outlet of the bypass valve to direct the flow of the unused fluid stream to the blower and control the second outlet of the bypass valve to prevent the flow of the unused fluid stream to the ejector in response to the controller determining that the load signal is below the first predetermined load level.

5. The system of claim 4 wherein the controller is further configured to control the blower to increase the flow of the unused fluid stream to the ejector in response to the controller determining that the load signal is below the first predetermined load level.

6. The system of claim 5 wherein the controller is further configured to control the ejector to decrease the flow of the unused fluid stream, the ejector is further configured to allow for a constant flow of the supply fluid stream in response to decreasing the flow of the unused fluid stream such that the flow of the input fluid stream supplied to the fuel cell stack is increased.

7. The system of claim 3 wherein the controller is further configured to control the first outlet of the bypass valve to prevent the flow of the unused fluid stream to the blower and control the second outlet of the bypass valve to direct the flow of the unused fluid stream to the ejector in response to the controller determining that the load signal is above the second predetermined load level.

8. The system of claim 7 wherein the controller is further configured to control the ejector to increase the flow of the unused fluid stream, the ejector is further configured to allow for a constant flow of the supply fluid stream in response to increasing the flow of the unused fluid stream such that the flow of the input fluid stream supplied to the fuel cell stack is increased.

9. The system of claim 3 wherein the controller is further configured to determine an on/off status of the fuel cell stack and the controller controls the bypass valve and the blower to allow for a predetermined amount of flow of the unused fluid stream to the ejector in response to the controller determining that the fuel cell stack is in the off state and the controller is further configured to prevent the flow of the unused fluid stream directly to the ejector.

10. A method for delivering an input fluid stream through a fuel cell stack, the method comprising the steps of:
    generating a supply fluid stream;
    discharging an unused fluid stream from the fuel cell stack to a bypass valve;
    mixing the supply fluid stream with the unused fluid stream to produce the input fluid stream;
    supplying the input fluid stream to the fuel cell stack to generate electrical current and drive a device in with the electrical current;
    measuring the electrical current used to drive the device to produce a load signal;
    comparing the load signal to a first predetermined load level;
    delivering the unused fluid stream from the bypass valve to a blower in response to determining that the load signal is below the first predetermined load level;
    comparing the load signal to a second predetermined load level;
    delivering the unused fluid stream from the bypass valve directly to an ejector in response to determining that the load signal is greater than the second predetermined load level;
    delivering the unused fluid stream from the bypass valve to the blower and the ejector in response to determining that the load signal is greater than the first predetermined load level and less than the second predetermining load level;
    determining an on/off status of the fuel cell system; and
    controlling the bypass valve and the blower to allow for a predetermined amount of flow of the unused fluid stream to the ejector in response to determining that the fuel cell stack is in the off state.

* * * * *